Feb. 1, 1966     E. D. RAZUM     3,232,067
FORAGE FREEZER AND PROCESS
Filed Aug. 1, 1963     4 Sheets-Sheet 1

INVENTOR.
ERNEST D. RAZUM
BY
*M. Ted Rapter*
ATTORNEY

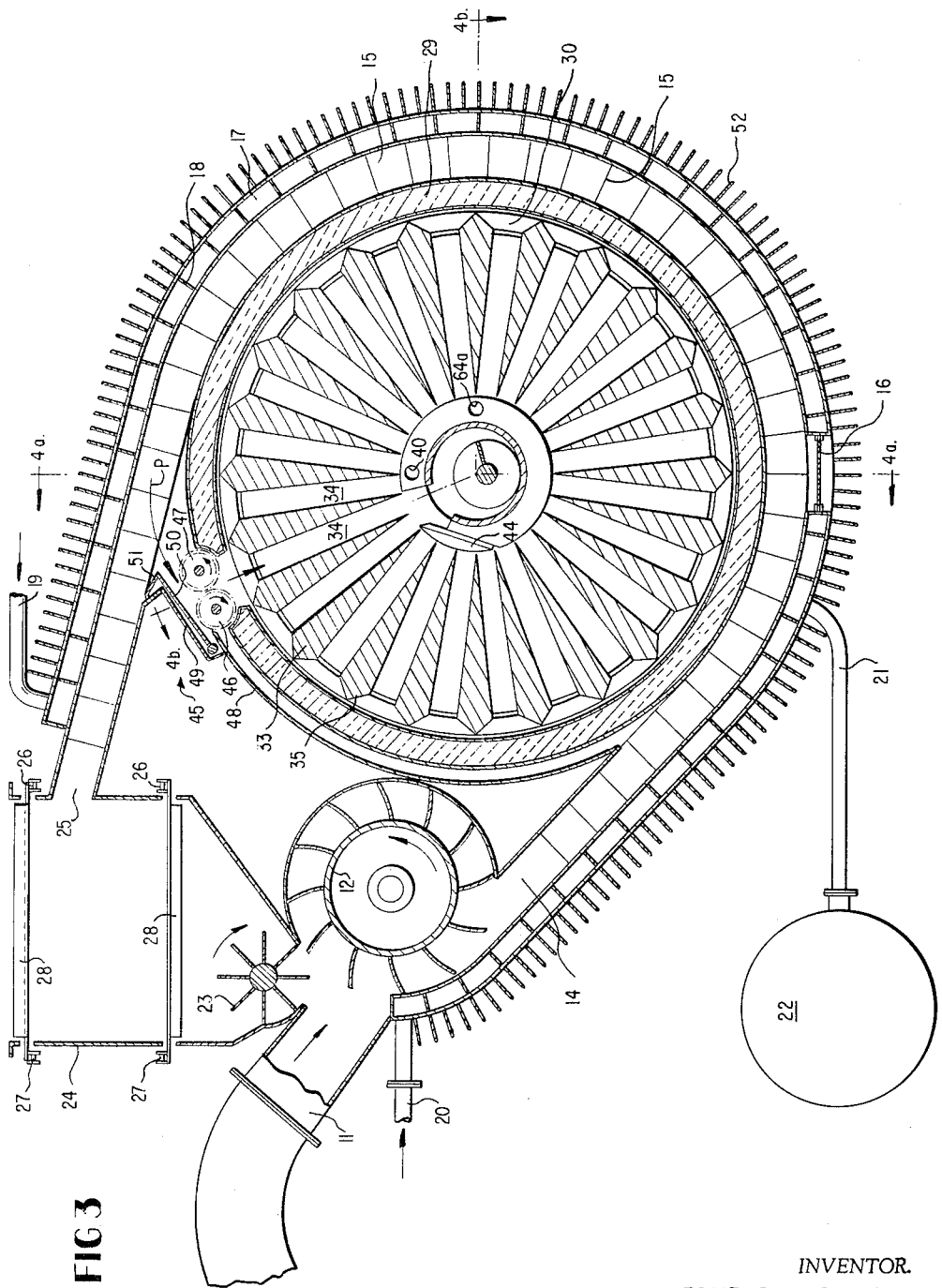

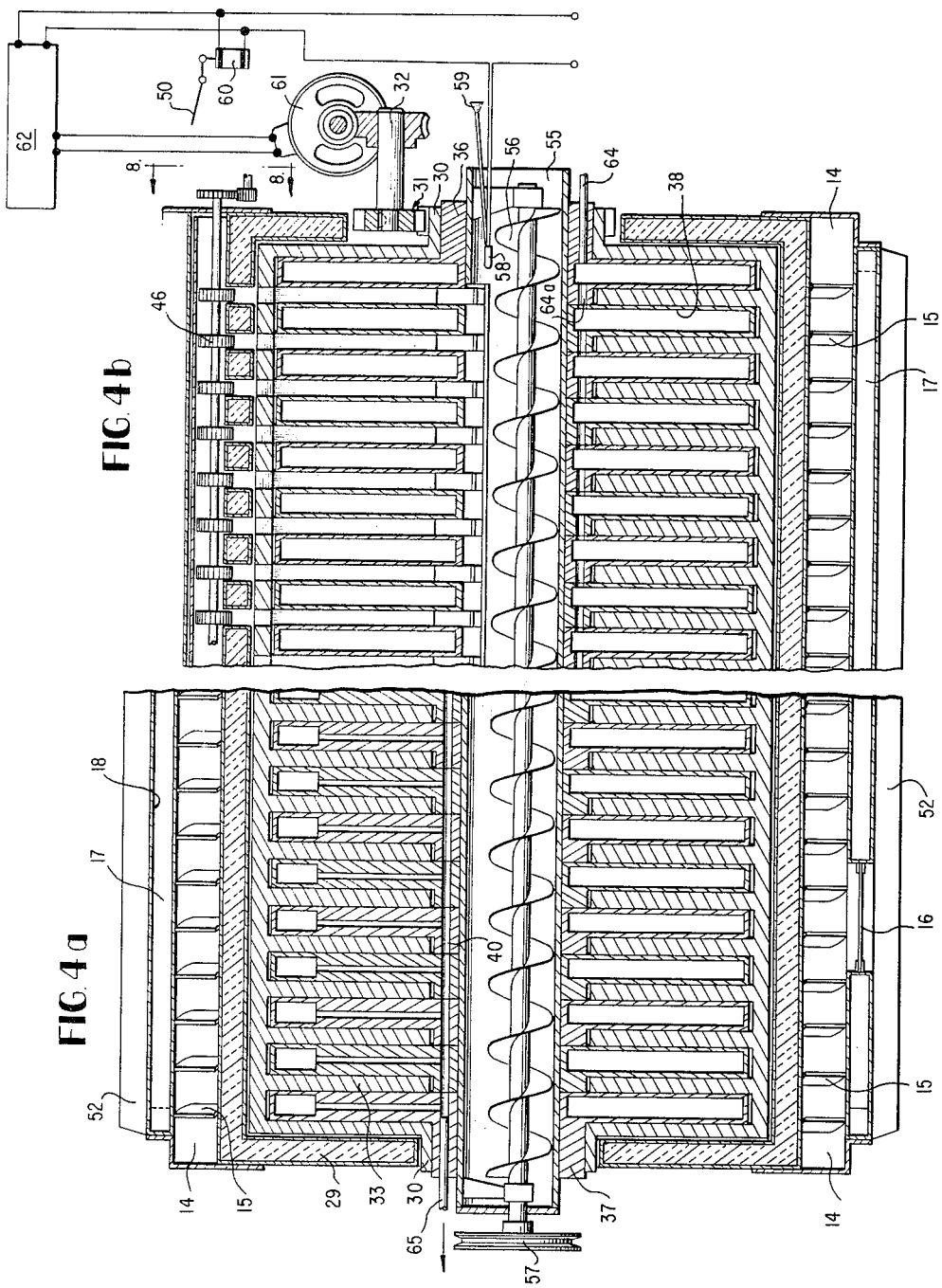

Feb. 1, 1966  E. D. RAZUM  3,232,067
FORAGE FREEZER AND PROCESS
Filed Aug. 1, 1963  4 Sheets-Sheet 4

INVENTOR.
ERNEST D. RAZUM
BY
*M. Ted Kaptes*
ATTORNEY

United States Patent Office 3,232,067
Patented Feb. 1, 1966

3,232,067
FORAGE FREEZER AND PROCESS
Ernest D. Razum, Box 104, Van Voorhis, Pa.
Filed Aug. 1, 1963, Ser. No. 299,279
14 Claims. (Cl. 62—56)

This invention relates to a novel process and to a novel machine for preserving all types of forage but may be used on any similar type product. More particularly, the invention relates to a novel process and to a novel machine wherein the forage may be frozen immediately after having been cut in the field.

According to the present invention, forage is frozen immediately after having been cut by mobile units, thus enabling the farmer to immediately realize a simultaneous gathering and preserving of forage. Under past and present practices in this art, it is necessary to perform a series of distinct steps, often carried out at various locations, to achieve a final end product, i.e., a stored quantity of forage ready for use whenever desired. Further, the practice of prior and present methods and procedures in this art entails the loss of substantial nutritive values in the final forage product. Such a loss in nutrients sometimes approaches 25% or more.

In the food arts, it has been recognized for some time that low temperature refrigeration applied very rapidly to crops after they are harvested, will preserve nearly 100% of the nutrient content of the product. Up to the present time, however, this realization has not found application in preserving food, particularly for animal consumption.

It is accordingly an object of the present invention to provide a novel process whereby forage immediately after having been cut may be frozen for storage for later use.

It is a further object of the present invention to provide a machine for use in combination with known forage harvesting machines which will immediately freeze the harvested product for later use.

It is a further object of the present invention to provide a machine for freezing harvested forage wherein a portion of the freezing process is accomplished through evaporative cooling, another portion being accomplished through a mechanical refrigeration system. The evaporative cooling is effected by utilizing the moisture contained in the forage.

It is a further object of the present invention to provide a forage freezing machine exhibiting a feedback temperature control whereby the temperature of the frozen end product may be maintained at any convenient value.

These and other objects of the present invention will become apparent from the following description.

In the drawings:

FIGURE 3 is a cross section taken along line 3—3 of FIG. 2.

FIGURE 4a is a cross section taken along line 4a—4a of FIG. 3.

FIGURE 4b is a cross section taken along line 4b—4b of FIG. 3.

Figure 1:
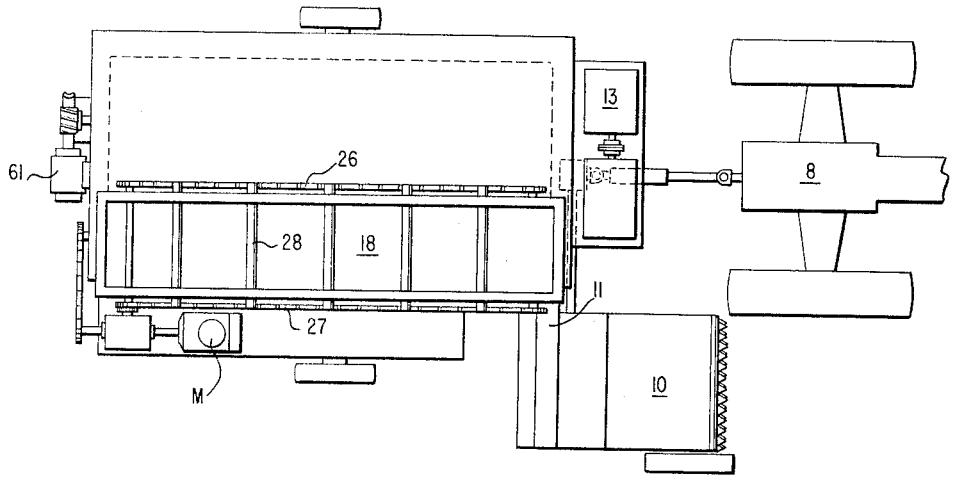
FIGURE 1 is a top view of the mobile forage freezer, according to this invention, shown in combination with a conventional forage harvester and a portion of a tractor.
Figure 2:
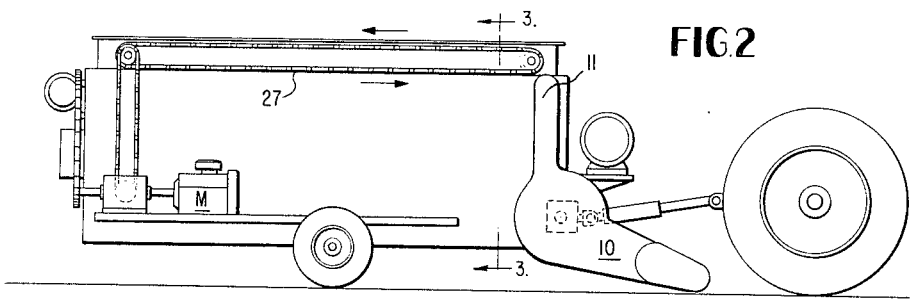
FIGURE 2 is a side view of FIG. 1.

Referring now to FIGURES 1 and 2 of the drawings, the numeral 8 denotes a portion of a tractor or other pulling implement for driving the freezer of this invention along the ground. Within the scope of the invention, the freezer may carry its own motive power. The numeral 10 denotes a conventional forage harvester, representing any one of a number of types presently available on the market and includes an upper discharge portion 11. The function of the harvester 10 is to cut and chop the standing crop and supply the chopped forage product into the front portion of the mobile forage freezer of this invention. The chopped product, as it enters into the freezer, is made up, by way of example, of approximately 85% moisture and 15% dry matter.

Referring now to FIGURE 3 of the drawings, numeral 12 denotes a heat-exchanger fan, adapted to rotate in the indicated direction, and operated by a suitable auxiliary engine indicated by the numeral 13 of FIGURE 1. The function of fan 12 is to blow the chopped forage product, delivered by harvester 10, through an annular heat exchange chamber denoted by the numeral 14 (see FIGURE 3). The chopped forage product is blown through the annular heat exchange chamber 14 and comes in contact during its journey with fins 15 in the chamber, thereby utilizing the moisture content of the product to withdraw heat from the fins 15 and the refrigerant which is circulated in the interior of the heat exchange chamber. This is a direct product evaporation system.

The numeral 16 of FIGURE 3 denotes a filter which may be formed of burlap and upon which excess moisture may accumulate and thereafter drop out of the device. This moisture is that which comes through the forage product as it bounces against the walls of chamber 14, the fins 15 and especially as the product passes through the feed rollers 46 and 47. A great amount of moisture is also eliminated through the open top of the hopper 24. This moisture is in the form of evaporated water which is carried out in the air that is blown through the annular chamber 14. This moisture and air carries the largest part of the heat out of the machine. The numeral 17 denotes the interior of the annular heat exchanger (condenser) and positioned therein are a plurality of vanes 18. The numerals 19 and 20 denote refrigerant inlet portions feeding into the interior 17. The arrangement of the vanes 18 is such that the flow of the refrigerant entering the interior follows a zig-zag path or pattern and directs the refrigerant to the front of the machine and then to the back of the machine and then to the front of the machine and then to the back of the machine, etc. This back and forth flow of the refrigerant is due to the fact that the first sectional vane or wall 18 extends the entire length of the machine and has an opening in the back and the next adjacent vane which is parallel thereto does not have an opening in the back, rather it has an opening in the front. This tortuous flow path provides a large condenser surface area.

The numeral 21 denotes an exit port or passageway for the refrigerant from the condenser 17 to a receiver 22. The receiver 22 will be more fully described later in connection with a detailed description of the refrigeration circuit.

The numeral 23 denotes a rotary agitator in the bottom of an elongated trough 24 and functions to preclude clogging in the trough. The numeral 25 denotes an exit at the rear portion of the path of the forage leading into the hopper 24. The numerals 26 and 27 denote two circular distribution chains, each of which are connected by a plurality of generally parallel angle elements 28. As seen from an inspection of FIGURE 1, the chains 26 and 27, driven through a motor M, cause translation of the lower angle members 28 towards the front of the machine and attendant directing of the forage product which falls into trough 24 from exit 25 to the front of the forage freezer. Both the agitator 23 and the fan 12 extend the length of the hopper 24, as does the exit 25 of chamber 14.

The numeral 29 (FIGURE 3) denotes a cylindrical body of insulation suitably covered. Another generally cylindrical element, denoted by the numeral 30 (FIG. 4b) is situated within the cylinder 29 and is adapted to rotate about a central axis. The numeral 31 (FIG. 4b) denotes a suitable gear driving connection between the cylindrical member 30 and a drive shaft 32. The numeral 33 (FIG. 3) denotes one of a plurality of identical steel fingers integral with cylinder 30 and revolvable therewith. The numeral 34 denotes the spaces between successive steel fingers 33. It will be observed that each steel finger 33 has an apex 35 at the radially outermost portion thereof.

Figure 5:
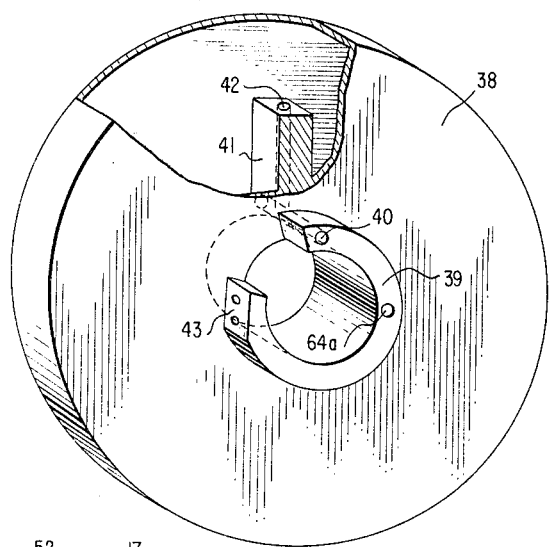
FIGURE 5 is a partially cut-away view of an evaporator disc shown in FIG. 4b.
Figure 6:
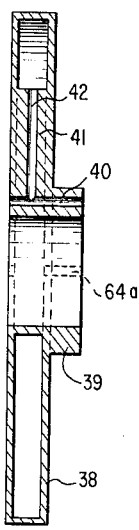
FIGURE 6 is a cross section of the evaporator disc of FIG. 5.

The numerals 36 and 37 (see FIGURES 4a and 4b) denote the two end evaporator discs generically designated by the numeral 38. Each disc 38 is in the form of a flat, hollow closed cylinder and carries a collar or hub 39 (FIGS. 5 and 6) preferably integral therewith and projecting from one side or face thereof. Perhaps best shown in FIGURES 5 and 6 of the drawings, each evaporator disc 38 includes a central passageway 40 extending completely through the collar 39. Numeral 41 denotes a thickened portion of limited annular extent extending completely between the opposite faces of the cylinder and provided therein with a radial passageway 42. The numeral 43 denotes a truncated surface on each hub 39 adapted to receive a cutting member 44 (see FIGURE 3). From an inspection of FIGURES 4a and 4b, together with FIGURE 3, it will be seen that the steel fingers 33, together with the spaces 34 defined therebetween, rotate relative to the insulating cylinder 29 and the plurality of aligned evaporator discs 38.

The numeral 45 (FIGURE 3) denotes generally a feeding combination of elements and includes a pair of oppositely rotating rolls 46 and 47, each including a plurality of spaced hubs, adjacent a curved covering plate 48 having a displaced portion 49 below which is pivotally mounted an adjustable feeding deflector blade 50. The blade 50 includes an outer bent-back portion 51 to preclude the entry of chopped forage behind the deflector blade. It will be observed that the deflector blade 50 runs the entire length of the freezer and, from an inspection of FIGURE 4b, the protruding portion of the oppositely rotating members 46 and 47 are positioned opposite the spaces between the evaporator discs 38.

Before proceeding further with description of the invention, a description of the operation of the above enumerated elements will now be set forth.

Figure 7:
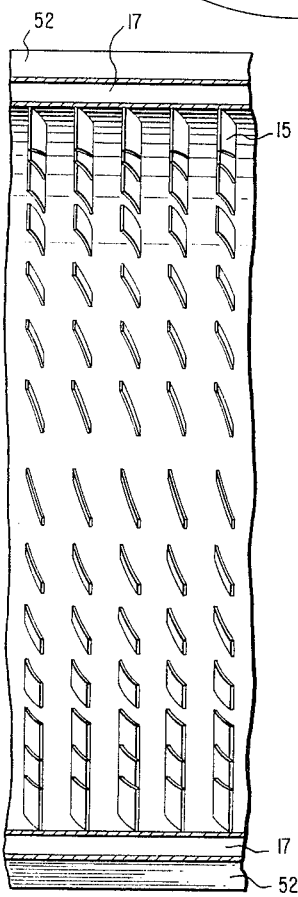
FIGURE 7 is a stretched out view of the annular heat exchanger chamber of FIG. 3.

The tractor 8 is run across the harvesting field and the forage harvester 10 cuts the forage and blows it through spout 11 into the front end of the freezer. The forage, encountering the action of rotating fan blade 12 (FIG. 3) is directed into the mouth of the heat exchanger chamber 14. The curvature of the fins 15 (FIG. 7) and their position relative to the air flow through the chamber 14 (FIG. 3) is such that a small amount of water is retained in the central part of each fin 15 at all times during normal operation of the machine. This water is removed from the forage product. A portion of the product on each fin is in physical contact with the water retained on that fin. The remaining product on each fin, not in contact with the water, is exposed to the air flow. As that portion of the product exposed to the air flow begins to dry out through evaporation, thus removing heat from the refrigerant in condenser 17, its specific weight is reduced. At a predetermined or particular specific weight, the air flow is sufficient to dislodge this partly dried portion of the product from the fin and force it onward to either the hopper 24 or the rotating feed rollers 46 and 47. The forage product thus lost from each fin is replaced by new forage product coming from the hopper 24 (FIGURES 1 and 3) and having a specific weight high enough to keep it lodged on the fins. The formation of scale, from minerals in water, on the interior surfaces of chamber 14 and upon fins 15 is precluded by the bombardment of forage particles thereagainst, thereby mitigating this problem common to many evaporative cooling systems.

The freezer uses several different methods to remove the heat from the refrigerant as the refrigerant passes through the refrigeration cycles. In the first method of heat transfer, heat from the refrigerant is conducted to the water lodged on the fins 15. The heat from the water on these fins is transferred to the water on the forage product by conduction. Evaporation by the air current on the exposed surface of the forage-product removes this heat. This air circulation through the annular chamber 14 now contains the pick-up heat and is discharged through the top opening of the hopper 24 through exit 25.

In the second method of heat transfer, heat from the refrigerant is conducted to the common wall between the condenser 17 containing the refrigerant and the annular chamber 14 containing the fins 15. The direct flow of outside cooler air removes some of the heat by direct evaporation of the moisture on these surfaces. (The moisture is deposited thereon by the moist product.)

In the third method of heat transfer in this refrigeration process, the moisture-contained-product and the outside air have a lower temperature than the air in the annular chamber 14 and much lower than the temperature of the walls forming the annular chamber and the fins 15 contained thereon. This cooler product and cooler outside air naturally lowers the temperature of the air in the chamber by their mere presence in the annular chamber. The bombardment of the cooler outside air and the cooler moisture-contained-product on the annular walls and fins absorbs the heat from the annular chamber walls and the fins. The bombarding particles absorb heat from the fins and the annular walls and as they continue their path around the annular chamber they lose picked-up heat by evaporating some of the moisture in the particles into the flowing air.

The fourth method of removing heat takes place on the outside surface of the freezer. This outside surface carries fins 52 which are exposed to the cooler outside air. The heat from the refrigerant in condenser 17 passes by conduction to the outer wall of the freezer and the outside fins 52. The heat on the outside wall and the fins is transferred to the outside air by convection and radiation.

Figure 8:
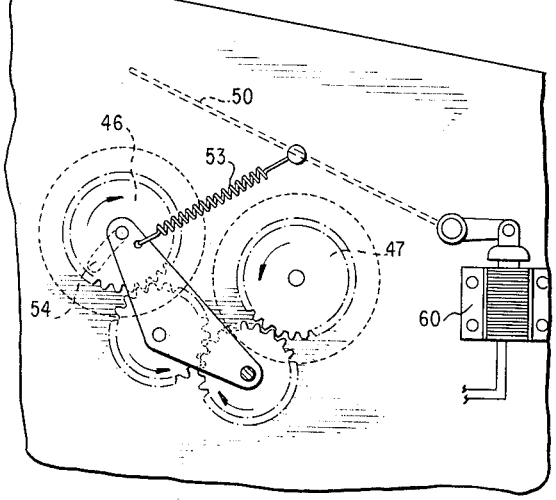
FIGURE 8 is an end view, partially schematic, of the feed roller driving mechanism and deflection blade actuated by a solenoid.

The fins 15 are shown positioned as to constrain the forage product to follow a helical path along the annular chamber from front to back of the freezing unit. One purpose of such a design is to direct the air around and between the fins 15 for evaporation. When the forage product reaches the area P (FIG. 3) adjacent assembly 45, the deflector blade 50 causes a portion of the product to impinge against rotating feed rollers 46 and 47 and force the product into the spaces 34 between the steel fingers 33. In this connection, note in FIGURE 8 that a spring 53 in combination with slots 54 in which the ends of roll 46 are supported acts to slightly compress the forage product as it enters the chamber 34.

Upon passing downward through chambers 34, i.e., passing radially inwardly, the forage product contacts the walls of evaporator discs 38, these discs containing a suitable refrigerant such as ammonia. Heat is abstracted from the forage product and when, at the lower or radially intermost portion of the chambers 34, it is sliced off by knives 44 mounted on the hubs of evaporator discs 38. The formation of frost (an undesirable concomitant in the freezing of foodstuffs) on the surface of the evaporator discs 38 is precluded by the rubbing thereagainst of both the fingers 33 and the forage product. After being chopped off by the knives 44, the now frozen forage product in the form of elongated cubes passes into chamber 55 provided with an auger 56 driven suitably by a pulley wheel 57. The length of the frozen forage product is determined by the speed of rotation of cylinder 30. The auger forces the forage out through the rear portion (see FIGURE 4b) of the freezer and into any suitable storage bin or wagon for later transfer into a permanent storage area.

Refer now to FIGURE 4b of the drawings, the numeral 58 denotes a control thermostat adapted to be set to any desired temperature by means of a manual control denoted by numeral 59. In the event that the final temperature of the product exiting through the tube 55 is not as cold as the selected temperature on the manual control, none of the forage product passes into the freezing area at point P because the solenoid 60 is de-energized and the deflector blade 50 closes. With the deflector blade in a closed position the forage product passes into elongated hopper 24 through exit mouth 25 wherein the action of the lower angles 28 causes the forage product to flow towards the front portion of the machine and this maintains an equal distribution into the hopper along the entire machine and into the agitator 23. It then passes to the fan 12 and thence to the entrance to chamber 14 for recirculation. When the solenoid 60 is de-energized, the motor 61 (FIG. 4b) which revolves the freezing zones 34 is also cut off to maintain the position of the coldest forage for first cutting by the blade when the machine resumes operation.

It will be observed that a rheostat 62 is utilized in conjunction with the motor 61 to vary the speed of rotation of the freezing drum and thereby vary the length of the frozen product as it is cut by blades 44.

Figure 9:
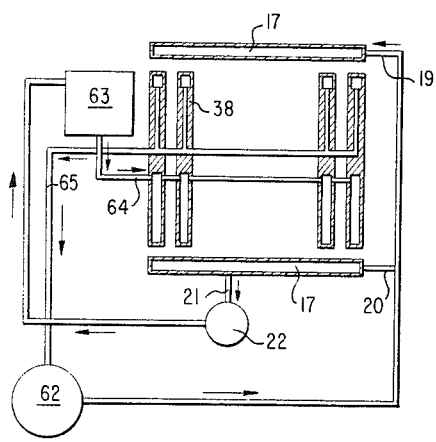
FIGURE 9 is a schematic view of the refrigeration circuit of the mobile freezing unit of this invention.

Referring to FIGURES 9 and 4a and 4b of the drawings, a description of the refrigeration circuit of the invention will now be set forth. The numeral 62 (FIG. 9) denotes a low temeprature compressor whose gaseous output is fed through passages 19 and 20 (FIGS. 3 and 9) to the interior of the condenser 17. It exits through conduit 21, at the bottom of the freezer, as a liquid, into a receiver 22 and from there to an accumulator 63. The accumulator 63 is provided with a float valve which maintains a constant level of the refrigerant in the evaporator discs, the float is established on the same height as the top of the desired refrigerant level in the evaporator discs. The refrigerant is fed to the evaporator discs from accumulator 63 through intake passageway 64, passes through aligned passageways 64a (FIG. 5) in the discs and exits through conduit 65 back to the compressor 62. It will be observed that the refrigerant enters the condenser 17 as a gas, is then cooled by air and evaporation. The refrigerant upon entering the evaporator discs at 64 as a liquid fills nearly the entire volume within each evaporator disc 38. Because the liquid refrigerant in the evaporator discs 38 abstracts heat from the forage as the forage passes radially inwardly through spaces 34, the refrigerant is heated, turning into a gaseous form, the gas passing from passageways 42 to passageways 40 and then exiting through conduit 65. Passages 40 (FIG. 6) are aligned and form a continuous duct communicating with conduit 65. The evaporator discs 38 abut each other with a gasket therebetween (not illustrated).

Considering the described refrigeration cycle somewhat more in relationship to the flow of forage, as the chopped forage passes into chamber 14 and passes therearound, exiting either at area P or exit 25, evaporative cooling takes place. The air flowing over the vanes 15 evaporates the moisture formerly contained in the forage product and thus cools condenser 17. In the case of liquid ammonia as the refrigerant employed, the boiling point of the refrigerant in the evaporator discs 38 is −28° F. at the atmospheric pressure therein. As the forage enters through point P and passes radially inwardly through chambers 34, heat is abstracted therefrom and the liquid ammonia in the evaporator discs, absorbing this heat, boils and hence passes into the gaseous phase. The gas exits through ports 42 and into aligned passageways 40 and out through conduit 65 to the compressor 62. There it is compressed from atmospheric (14.7 p.s.i.) pressure to approximately 170 p.s.i. This increase raises the boiling point of the ammonia to approximately 100° F. The pressurized gas refrigerant is now sent through conduits 19 and 20 to the condenser 17. There, the evaporative cooling from the moist forage and moving air causes the ammonia gas to condense into a liquid. As a further factor in condensing the gas to a liquid, at an outside temperature of 90° F., a typical summer temperature, the gaseous refrigerant coming from compressor 62 transfers heat to the ambient air through fins 52. The ammonia, now in liquid form in condenser 17, is now fed to the accumulator 63 from a receiver 22, as above described.

Thus, the forage freezer of this invention, while utilizing a known mechanical refrigeration cycle, utilizes the evaporative cooling effect from the moisture in the product upon which the device works to effect condensation of the refrigerant. Further, this same evaporative cooling reduces the temperature of the forage product, thereby reducing the cooling demand on the closed cycle refrigerant system.

What is claimed is:

1. A mobile forage freezing machine including means defining an outer curved path for the passage of forage therealong, a forage freezing mechanism positioned adjacent said forage path, means for deflecting forage from said forage path into said freezing mechanism, and means for sensing the temperature of forage frozen by said freezing mechanism to thereby vary the said deflecting means.

2. A mobile forage freezing machine including means defining an annular path for the passage of forage, a plurality of fins in said path, said forage adapted to contact said fins during its path to thereby effect evaporative cooling, a freezing mechanism adjacent said path, means for deflecting said forage from said path into said freezing mechanism, means to recirculate a portion of the input of said forage along said path, and means to discharge frozen forage from said freezing mechanism.

3. A method for the freezing of freshly cut forage, said method including the steps of cutting forage to thereby liberate moisture therein, immediately blowing said forage into a heat exchange means comprising a closed pathway, moving said forage along said closed pathway to thereby reduce the temperature of said forage by evaporative cooling, and then subjecting said forage to a freezing treatment in a freezing mechanism within said closed pathway to further reduce the temperature of said forage, said evaporative cooling simultaneously condensing gaseous refrigerant included in a cycle of said freezing treatment.

4. A process for the preservation of forage, including the step of lowering the temperature of said forage by evaporative cooling while simultaneusly condensing gaseous refrigerant thereby and then further lowering the temperature of said forage by the step of cooling said forage by direct moving contact with a heat abstracting surface while simultaneously evaporating said condensed refrigerant thereby.

5. The process of preserving forage, including the steps of passing moist forage through a chamber which is in thermal communication with another chamber which contains a gaseous refrigerating substance to thereby condense said gaseous refrigerating substance into a liquid form and then passing said forage through another chamber in thermal communication therewith to thereby abstract heat from said forage and cause said refrigerating substance to assume a gaseous form due to said heat abstraction.

6. The process of claim 5 wherein said first mentioned chamber is provided with abutments against which the forage abuts in its passage through the first mentioned chamber.

7. A forage freezing machine including means defining an outer passageway for the passage of cut forage therethrough, means to selectively deflect said forage from said passageway, means for feeding said deflected forage, successively, into a plurality of freezing compartments, said freezing compartments being revolvable and movable relative to said forage deflecting means, a receiving chamber common to said freezing compartments, said chamber collecting said frozen forage and means in said chamber for moving said forage out of said chamber.

8. A mobile forage freezing machine including means defining an annular path for the passage of forage therealong, vanes disposed in said path for evaporative cooling, means for blowing air along said path to thereby urge said forage along said path, means for selectively deflecting forage from said path, a plurality of spaced and aligned hollow evaporator discs, a plurality of radially disposed fingers whose spaces therebetween define freezing compartments, said fingers being rotatable and being positioned between said discs, means for urging deflected forage, successively, into said freezing compartments as said fingers rotate, means centrally of said fingers for receiving said frozen forage, means centrally of said rotating fingers for cutting said frozen forage into discrete masses, means centrally of said rotating fingers for conveying the discrete masses along the axis of rotation of said fingers, said fingers being relatively rotatable with respect to said hollow evaporator discs, fluid inlet and outlet means carried by said plurality of evaporator discs, means for sensing the temperature of the frozen forage, said temperature sensing means positioned at the end of said conveying means for conveying said discrete masses, means coupling said temperature sensing means and said deflector means for actuating said deflector means in accordance with the temperature and means for rotating said plurality of fingers.

9. A forage preserving machine, including means defining an outer passageway for the passage of forage therealong, said passage including a plurality of vanes therein substantially integral therewith, a blower for forcing said forage along said passageway for evaporative cooling, the said vanes deflecting the forage along said passage and for evaporative cooling, means for deflecting the forage from said passage and into a freezing mechanism, means for recirculating a portion of the forage along said passageway, means for sensing the temperature of the forage after the forage passes through said freezing unit and is frozen, said freezing unit being rotatable relative to said deflection means and to said forage passageway, means for rotating said freezing unit, means coupling the action of said deflector means and said means for rotating said freezing mechanism, means for varying the speed of rotation of said freezing mechanism, an elongated bin adapted to receive forage which is to be recirculated, means carried by said bin for distributing forage therealong, means for agitating said forage in said bin to preclude jamming of said forage therein and means along said forage flow path for allowing excess moisture to escape from said flow path.

10. A forage preserving machine including a plurality of hollow spaced evaporator discs substantially coaxial, a plurality of fingers between each of said evaporator discs, said fingers being revolvable about the same longitudinal axis as the axis of said aligned discs, each of said evaporator discs including means for introducing fluid therein, each of said evaporative discs including a fluid passageway leading from the top thereof to a central portion thereof to thereby collect gas from adjacent the top of said disc at the central portion.

11. A forage preserving mechanism including means defining an outer passageway for the flow of forage therealong, a blower for forcing said forage along said path to produce evaporative cooling, a plurality of vanes positioned in said forage passageway, said passageway having an inlet at one end thereof and an outlet at the other end, said vanes within said flow passageway being curved to constrain the forage entering said inlet to leave said passageway at points laterally spaced from said inlet.

12. A forage freezing machine including means defining a first outer chamber through which cut forage is adapted to pass, means for forcing forage through said first chamber, a refrigerant condenser chamber in thermal communication with said first chamber, a forage freezing unit adjacent said first chamber and insulated therefrom, means to adjustably deflect forage from said first chamber to said freezing unit, a refrigeration circuit including a compressor, the said condenser chamber and a plurality of evaporator elements, said evaporator elements forming a portion of said freezer unit, the output of said refrigerant compressor passing to said condenser chamber, the moisture from the cut forage adapted to evaporatively cool said first chamber and, through its thermal communication with said condenser chamber, to hence cool said condenser chamber and thereby condense the gaseous output of said compressor to a liquid, a fluid path from said condenser chamber to said evaporator elements, the said evaporator elements adapted to abstract heat from the forage product with the abstracted heat turning a portion of the liquid in the evaporator elements into gaseous form, a fluid path from the evaporator elements leading the gaseous form to said compressor for recompression.

13. The forage freezing machine of claim 12 which includes an accumulator in the said fluid path from said condenser chamber to the said evaporator elements.

14. The forage freezing machine of claim 12 including a plurality of fingers relatively rotatable with respect to said evaporator elements, the said spaces between the fingers adapted to receive the deflected forage, and means to vary the speed of rotation of said fingers as a function of the temperature of the forage after it passes over said evaporator elements.

References Cited by the Examiner

UNITED STATES PATENTS

| 1,343,051 | 6/1920 | Gosline | 62—515 |
|---|---|---|---|
| 2,228,998 | 1/1941 | Birdseye | 62—332 X |
| 2,229,000 | 1/1941 | Birdseye | 62—332 X |
| 2,781,645 | 2/1957 | Simmons | 62—515 |
| 2,784,566 | 3/1957 | Reynolds | 62—381 |
| 2,787,141 | 4/1957 | Julius | 62—63 |
| 2,825,211 | 3/1958 | Gessel | 62—62 |
| 2,978,883 | 4/1961 | Jessee | 62—381 |
| 3,048,987 | 8/1962 | Wentworth | 62—381 |
| 3,089,316 | 5/1963 | Robbins | 62—381 |

EDWARD J. MICHAEL, *Primary Examiner.*